Nov. 5, 1968

W. A. BOOTHE ET AL 3,409,032

FLUID-OPERATED FREQUENCY SENSING CONVERTER

Filed Oct. 21, 1965

INVENTORS:
WILLIS A. BOOTHE
CARL G. RINGWALL
LONNY R. KELLEY
DONALD L. REXFORD

BY

Harry C. Burgess
ATTORNEY

INVENTORS:
WILLIS A. BOOTHE
CARL G. RINGWALL
LONNY R. KELLEY
DONALD L. REXFORD

BY Harry C. Burgess
ATTORNEY

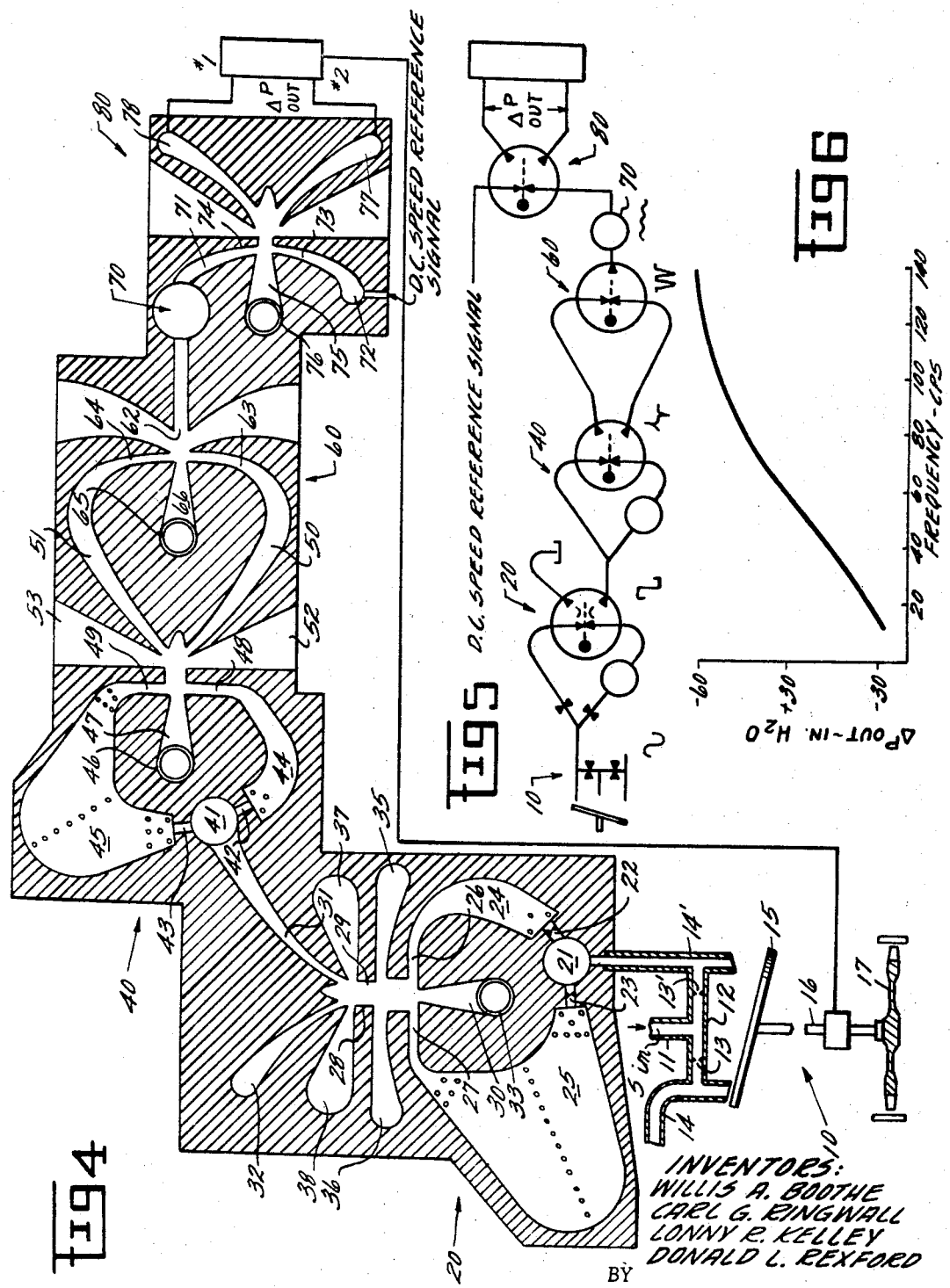

United States Patent Office 3,409,032
Patented Nov. 5, 1968

3,409,032
FLUID-OPERATED FREQUENCY SENSING CONVERTER CIRCUIT
Willis A. Boothe and Carl G. Ringwall, Scotia, Lonny Ray Kelley, Ballston Lake, and Donald L. Rexford, Schenectady, N.Y., assignors to General Electric Company, a corporation of New York
Continuation-in-part of application Ser. No. 457,074, May 19, 1965. This application Oct. 21, 1965, Ser. No. 499,403
7 Claims. (Cl. 137—36)

ABSTRACT OF THE DISCLOSURE

The disclosure shows a fluid signal circuit wherein an input signal is first converted to a square wave signal of fixed amplitude. A derivative circuit derives a pulse output for each change in the square wave signal. The pulses have a fixed energy value representative of a half cycle of the square wave. The pulsating output of the derivative circuit is converted to a uniform pressure, the magnitude of which is proportionate to the frequency of the input signal. The circuit may be employed in a control loop with the frequency of the input signal reflecting the rate of operation of a given element and the output signal employed, through transducer means, to maintain a desired rate of operation for that element.

---

This invention relates to a frequency sensing circuit and, more particularly, to a fluid operated frequency-to-analog signal converter circuit. This application is a continuation-in-part of application Ser. No. 457,074, filed May 19, 1965 now abandoned.

There are many instances in technology, particularly in the design of control equipment, where it is desired that a system be monitored so that immediate corrective action may be taken when the system deviates from the normal operating condition. It is possible, for example, to generate an "A-C" signal frequency that is a function of position or displacement, gas or liquid temperature, liquid level, or pressure changes. The selected condition or signal in other words, may comprise any function or condition which may be sensed for measurement, by suitable transducer means, to provide a signal to be compared with a reference signal.

In modern engine control systems high reliability, ruggedness and fast response are primary design goals. Fluid control devices are particularly suitable for such applications due to their high operating speeds compared to conventional electro-mechanical, hydraulic, or hydro-mechanical systems. Also, having no moving parts requiring bearing surfaces and being relatively insensitive to shock, vibration or temperature effects, these fluid operated devices, or fluid amplifiers, have found increasing favor with controls engineers. Known fluid amplifiers comprise two basic categories, the analog and the digital type. Both operate on the principle of deflecting a main power jet which, conventionaly, consists of a constant relatively high pressure flow directed to impinge on at least one of two fluid flow receivers. In a fluid amplifier of the analog type, specifically, deflection of the main or power jet is accomplished by the "momentum interaction" principle wherein sideways (i.e., generally perpendicular to the main jet flow direction) movement is imparted by means of a control fluid flow jet of lower pressure. Digital amplifiers, on the other hand, utilize jet attachment to a wall (coanda effect) and have the operating characteristics of a "flip-flop" circuit. In either case, control jets are usually positioned in pairs in an opposing relationship across the power jet. The magnitude of the power jet deflection is proportional to the *net* sideways momentum imparted by the control jets in the analog fluid amplifier. Deflection results in one receiver obtaining more fluid flow or receiving a higher pressure, while the other receives less pressure due to reduced flow. Since deflection is proportional, the output or pressure at the receivers is proportional to the net input or pressure at the control jets.

In the design of modern gas turbine engine speed controls, in particular, it is desirable to be able to sense the magnitude of the rotational speed (r.p.m.) of the turbine shaft for immediate corrective action whenever the speed gets outside certain operating limits. The turbine shaft, through a suitable transducer, may be made to generate an "A-C" or sinusoidal signal of a certain frequency which can be made to work in a sensor of proper design to return the shaft speed to normal.

It is therefore a general object of this invention to provide a fluid amplifier circuit capable of converting any sinusoidal fluid pressure signal to an output pressure signal.

It is a further object of this invention to provide a fluid amplifier circuit capable of converting an "A-C" signal input to an output pressure proportional to the input signal.

It is a more specific object of this invention to provide a fluid amplifier engine speed control for use in a gas turbine engine control system.

It is a still more specific object of this invention to provide a frequency-to-analog fluid amplifier signal converter which can function as a wide-range turbine shaft speed governor by providing a pressure signal inversely proportional to the input frequency.

In carrying out our invention in one embodiment thereof, we provide a fluid amplifier circuit which can be utilized for controlling equipment operation as, for example, the speed (r.p.m.) of a gas turbine engine. The circuit comprises means adapted to receive a fluid pressure input signal fluctuating at a rate dependent upon a monitored operating condition (i.e., r.p.m.) of the equipment. More specifically, a sinusoidal input signal is fed to signal converting means for deriving a steady state fluid pressure output signal having a magnitude proportional to the frequency of the input signal. A described example of such signal converting means includes a first fluid operated device generating a square wave of fixed or limited pressure amplitude, the frequency of the square wave being the same as that of the input signal. The square wave is then fed to a second fluid operated device comprising a "full-wave rectifier," the square wave passing through a capacitance, in one arrangement in the line connecting the first and second devices. The "rectifier" will produce a pulse for every positive or negative going pulse, i.e., reversal of the signal, fed into the "rectifier." These latter pulses are then filtered to provide the substantially steady-state or "D-C" pressure level output signal. The valve of the capacitance and the output and input impedances of the first and second devices, respectively, in the described embodiment are selected to assure a constant value for the time it takes for a complete reversal of the signal at the control ports of the rectifier, regardless of the frequency of the input signal, for a period of time equal to or less than one-half of the frequency of the input signal. In this manner, the magnitude of the output signal is caused to vary linearly with changes in input signal frequency over the effective operating range of the circuit. Thus, the time periods for each cycle during which the power jet of the second fluid operated device is effectively acted upon by the control port signals will accurately reflect—over the circuit operating range—the frequency at which the control signal is varying. This, then, results in a circuit output proportional to the time average of the pulses generated by the second fluid operated device.

In a further described arrangement of the invention utilizing a final "push-pull" output stage, at lower frequencies of the sinusoidal input signal the pulses from the rectifier portion of the circuit result in a larger "D-C" component than at the higher frequencies. Using a "D-C" reference signal for the other input to the final stage, at the desired engine speed the final "push-pull" analog fluid amplifier outputs are equal; if the speed is high, one input is greater than the other, the differential output going positive; if the speed is low, the differential pressure output goes negative. In this latter arrangement the circuit can function as an engine speed governor as the output is inversely proportional to the input frequency.

The invention is pointed out with particularity in the appended claims. However, other objects and advantages, together with the operation of the invention, may be better understood by reference to the following detailed description taken in connection with the following illustrations wherein:

FIG. 4 is a diagrammatic view in top plan of a further embodiment of the frequency-to-analog signal converter of the present invention being capable of being utilized as a pneumatic derivative speed governor;

FIG. 5 is a schematic diagram, with wave forms, illustrating the operating characteristics of the embodiment of FIG. 4; and FIG. 6 is a graph illustrating the wide frequency range capabilities of the invention.

While the specific application discussed in detail is in a gas turbine control system, especially a shaft speed sensing device and governor, it will be understood that the invention is equally useful in a variety of applications requiring conversion of an "A-C" frequency signal to a useful proportional analog output signal ("D-C" pressure).

Figure 1:
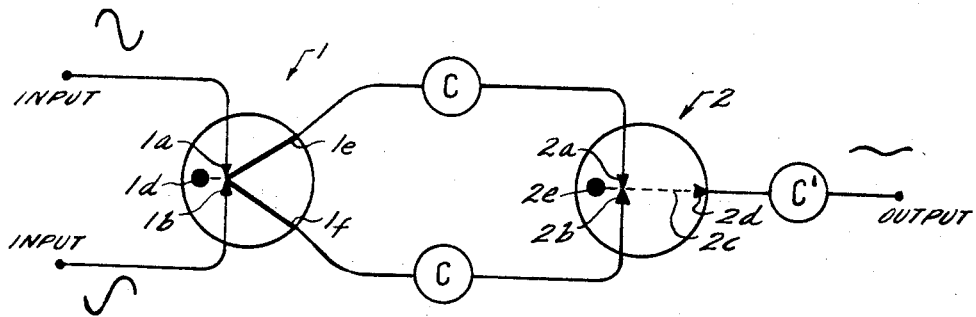
FIG. 1 is a schematic diagram of the invention in the form of a digital amplifier driving a rectifier to provide a signal *directly* proportional to the frequency of the input signal.
Figure 1A:
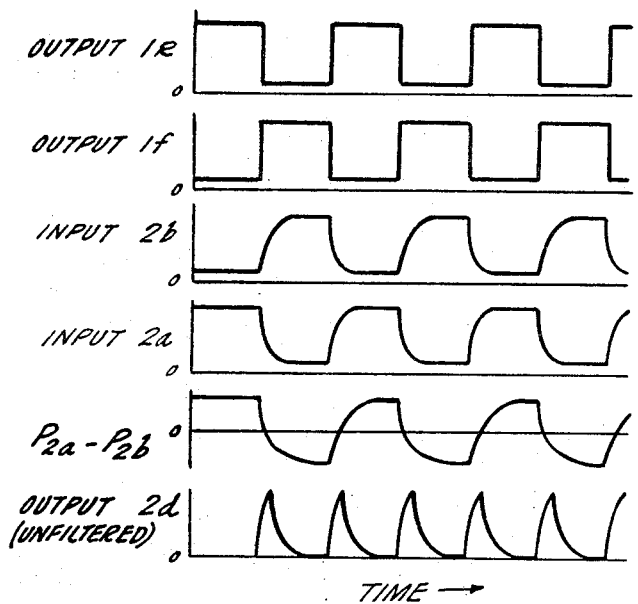
FIG. 1a is a graph illustrating significant waveforms on a time base for the circuit of FIG. 1.

Referring to FIG. 1, indicated generally at numeral 1 is a fluid operated device or amplifier of the digital variety. While in the FIG. 1 embodiment the device comprising the first stage of the circuit is indicated schematically as being of the digital variety, the circuit could function as well if, in the alternative, it were a proportional device with limiting as hereinafter described. In either case, the output is a square wave. The converse will hold true, of course, for the apparatus depicted schematically in FIG. 2, also described hereinafter in detail. The digital amplifier indicated at 1 in FIG. 1 is adapted to receive a push-pull sinusoidal input signal at its control ports 1a and 1b. The "A-C" fluid pressure signals at the control ports operate in the normal manner to deflect a power jet issuing from a main orifice 1d connected to a source (not shown) of fluid (e.g., air) under pressure. Use of a digital device at this point will result in the fluid amplifier output wave being of fixed amplitude, i.e., a square wave, substantially as shown. The square wave output of the fluid amplifier 1 at receiver ports 1e and 1f, respectively, is fed—through capacitance C, if desired—to a fluid operated proportional "rectifier" device, indicated generally at 2. It will be seen that the inputs to control ports 2a and 2b of the rectifier are 180° out-of-phase by reason of the alternating pulses at the receiver or output ports 1e and 1f, respectively, of amplifier 1. The "rectifier" device 2, as will be noticed, while similar in appearance to the fluid operated amplifier 1 differs in that the "rectifier" has but a single receiver channel or port 2c for the main jet 2d issuing from the power stream orifice 2e. The output signal at 2d is a maximum when the power jet is centered and will drop as the power jet is deflected to either side. A pressured ifferential between control ports 2a and 2b of the "rectifier" thus causes a decrease in the output pressure at port or receiver 2d. Since the inputs 2a and 2b are always 180° out-of-phase at the control ports, the power jet is fully deflected alternately to one side and then the other and the output of the "rectifier" is "normally" at a minimum. Every time the input signal to the circuit changes direction, however, the output of "rectifier" 2 will momentarily increase in pressure as the power jet sweeps by the single receiver. For a square wave input, the resulting output pulse will be infinitely short. However, by adding capacitance volume C in the lines between amplifiers 1 and 2, as shown, the sharp rises and drops in pressure of the square wave are altered to exponential rises and drops. The exponential time constant is governed by the capacitances C, the output impedances of the amplifier device 1, and the input impedances of amplifier device 2. As a result, it now takes a finite period of time for the power jet 2e to sweep by receiver 2d and the output pressure at receiver 2d approximates a triangular wave, as shown in FIG. 1a. The total time duration of each triangular output wave corresponds to the time for the jet to sweep by the receiver and is governed by the exponential time constant obtained by inserting capacitance volumes C. The output wave shape will be independent of frequency up to frequency levels having a half-period corresponding approximately to the aforesaid time duration.

Figure 3:
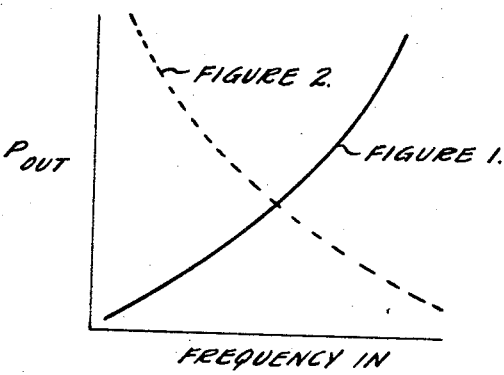
FIG. 3 is a graph illustrating the characteristic slope of the outputs of the FIGS. 1 or 2 embodiments (solid and dotted lines, respectively)

The capacitance volume C' on the output 2d of the rectifier serves as a filter which tends to produce an output proportional to the time average of the output 2d. Specifically, the wave shapes for each of the outputs and inputs of the fluid amplifier circuit of FIG. 1 are indicated in the FIG. 1a graph. It should be noted that the graph indicates tha tthe filtered output is proportional to the area under the curve for the waveshape output (unfiltered) at 2d and that, in this case, while the area under each curve is a constant, with increased frequency the *total* area is larger per a specified unit of time due to a greater number of pulses being put out by the rectifier. Thus, as frequency is increased, the filtered output signal will increase in level, as shown in the graph of FIG. 3. The output signal is, therefore, an indication of the speed of an engine shaft, for example, which in rotation can be made to generate the input signal through suitable transducer means, as more fully described hereinbelow.

Figure 2:
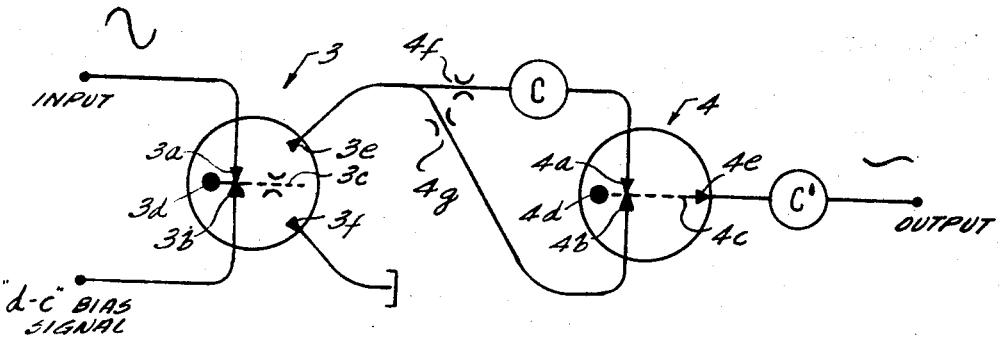
FIG. 2 is a circuit arrangement similar to the FIG. 1 embodiment but wherein the "D-C" signal out is *inversely* proportional to the input signal frequency.
Figure 2A:
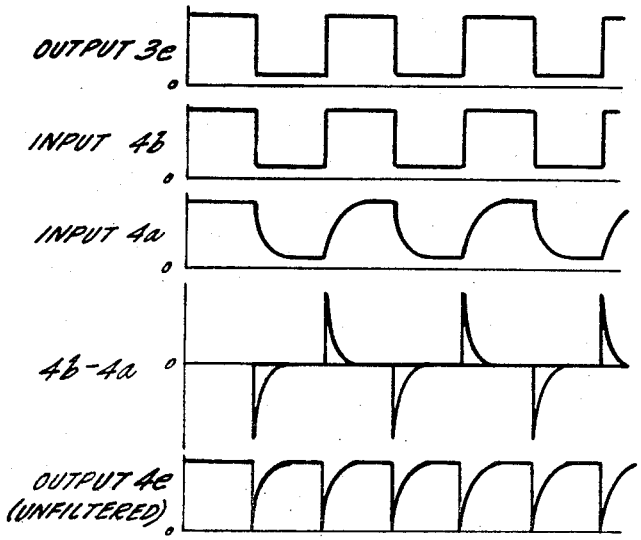
FIG. 2a is a graph illustrating significant waveforms on a time base for the circuit of FIG. 2.

The FIG. 2 fluid amplifier circuit, on the other hand, illustrates an arrangement providing for an output signal *inversely* proportional to the input frequency. Such a circuit would obviously be of great benefit as a speed governor, as will be apparent from the FIG. 3 graph of the output of the circuit shown in FIG. 2. Specifically, an analog amplifier, indicated generally at 3, is provided although, as stated above, alternatively a digital device could be utilized. A sinusoidal input signal is fed into the amplifier through a control channel or port 3a, the other control port 3b being connected to a "D-C" bias or reference pressure. The main jet 3c issuing from orifice 3d is acted upon by the control port pressure to cause an output signal in receiver ports 3e and 3f. The output signal from port 3e, in the form of a limited or square wave, is fed to a combination "derivative" amplifier and "rectifier" stage, indicated generally at 4. That is, the input or control ports 4a and 4b receive the square wave as follows. As the square wave enters the line leading to port 4a, it passes through a restrictor 4f and a capacitance C or tank before reaching the port. Since the same wave or signal is simultaneously fed directly to port 4b through an equal restrictor 4g in the line leading to the latter port, there is a differential pressure variation seen at the control region, i.e., the area where the control port jets act upon the main jet 4c issuing from port 4d. Thus, there is an immediate pressure rise at control port 4b, since there is no capacitance in that line and a lag in the effect of the input signal at port 4a due to the capacitance in the line to 4a. The result is a spike or "differentiated" square wave deflection of the jet 4c, as seen in FIGS. 2 and 2a which is "rectified" as before. The "time constant" of the circuit is established by restrictor 4f and capacitance C so that pulses of uniform width have a fixed or constant decay time for each variation or change in direction of the square wave input signal. In this case, the jet 4e is normally centered so that the output at 4e is maximum when no pulse is present. Each positive or negative step change in input square wave 3e produces a negative pulse superimposed on the normally positive "D-C" output level at output 4e. The capacitance or filter in the output leg of the amplifier 4 will again smooth out the pulses—negative going in this case—to provide the "D-C" output signal. Note that here, due to the use of a combined "derivative-rectifier" stage the pulses are negative going spikes, one spike being produced for each positive *and* negative swing of the "differentiated" 4b–4a pressure signal. Note, also that FIG. 2a shows that the filtered output is again proportional to the area under the curve 4e. Thus, a signal useful as a speed governor is produced, as shown in FIG. 3, since the *higher* the frequency the *lower* the "D-C" output pressure level.

Turning now to FIG. 4 which includes a plan view of an actual circuit block incorporating another embodiment of our invention, shown is a sinusoidal signal generator or transducer 10 which provides two fluid pressure signals of equal and constantly varying magnitude which are 180° out-of-phase. One signal ($S_{out}$) is fed to a "decoupler and limiter" stage or circuit 20. From there the signal, in the form of a square wave of the same frequency as the signal generator output, passes into a "derivative" circuit 40. The derivative circuit takes the square wave and through means of a push-pull output provides one positive and one negative spike for each cycle of the input signal. Next, the signal is fed into a fluid operated "full-wave rectifier" 60 arranged to produce a negative pulse for every negative *and* positive spike of the signal from the derivative stage 40. From the "rectifier" 60 the signal is filtered by capacitive means 70 to remove the ripple component from the rectified signal. The filtered signal becomes one input to the final stage, a push-pull analog fluid amplifier 80. The other input to the fluid amplifier 80 is a "D-C" speed reference or "demand" signal generated in the main engine control system (not shown). Comparison of the two signals in the final push-pull stage yields a differential pressure output signal ($\Delta P_{out}$), which is function of the speed error, to provide a useful pneumatic speed governor circuit in this example.

Turning now to a more specific description of each stage or circuit component in this embodiment, the signal generator or transducer 10 comprises a supply conduit 11 connected to a source of pressurized air (not shown). The pressurized air ($S_{in}$) passes to a conduit 12 intermediate equal sized orifices 13–13′ and thence to lateral conduits 14 and 14′. One end of conduit 14 is open to ambient pressure (atmosphere), through a suitable restrictor with a like end of conduit 14′ being connected to an input chamber 21 of the decoupler circuit 20. The respective opposite ends of conduits 14 and 14′ are open to atmosphere opposite a tilted plate 15 rotated by a shaft 16 coupled by suitable means to the shaft of a turbine 17. As the shaft 16 and turbine 17 rotate, plate 15 wobbles to alternately control escaping air from the adjacent open ends of conduits 14 and 14′, respectively, in a sinusoidal fashion. This causes a sinusoidal pressure variation in the conduits resulting in the pressure at the inlet chamber 21 also varying sinusoidally. Thus, the rotational speed (N) of turbine 17 is converted to a frequency in the form of a pressure signal having a "D-C" (pressure level) component and an "A-C" or sinusoidal component. While one input leg 14′ is utilized obviously both legs 14 and 14′ could be used to provide a push-pull input, i.e., two sinusoidal signals 180° out-of-phase to be fed to the control legs of circuit 20.

The input signal in the form of a sine wave, as seen in FIG. 5, passes from the small decoupler input chamber 21 through equal-sized orifices 22 and 23 into a pair of control channels. Channel 24 is a nominally-sized input channel for a fluid amplifier. Channel 25, on the other hand, is enlarged in order to ensure that the output signal from the decoupler is derived solely as a function of the input signal pressure variation and not as a function of any variation in the reference pressure level about which the input signal pressure is varying. In other words, the input channels to the control jets or ports 26 and 27 are tuned to serve as a high-pass filter where relatively slow changes in the steady state reference pressure of the input signal will be equally effective at jets 26 and 27 and thus have no effect on the cyclic variation in the output stream of the decoupler. Thus, in the frequency range at which the frequency-to-analog converter circuit is designed to work, the input signal passing through orifice 23 into the enlarged or "capacitive" channel 25 is so attenuated by the relatively great volume of the channel that gain is constant, i.e., no pressure variation results from the signal at control nozzle or jet 27. This is effective to essentially remove "D-C" component of the reference pressure—which could vary in level—and leave only the "A–C" or sinusoidal pressure variation component from the transducer, i.e., the signal into control jet or nozzle 26, having passed through small channel 24, is effective to oscillate the decoupler output in sinusoidal fashion.

The fluid-operated device shown also utilizes deflection limiters 28 and 29 in the form of non-attaching side walls which prevent the main or power jet from nozzle 30 from deflecting beyond a certain point. Thus, the pressure output at the receivers 31 and 32 is fixed at a pre-determined limit. It will therefore be seen that in the decoupler-limiter stage 20, the main or power jet from nozzle 30 is connected to a port 33 to which fluid (e.g., air) is supplied under pressure from a suitable source (not shown) in the manner of the conventional fluid amplifier. This main or power jet is then acted upon by the decoupled, or sinusoidal varying signal pressure from the control jet 26. The deflected jet is limited by the deflection-limiting wall arrangement in the "control region" of the fluid amplifier, the stream then passing into the "jet region" of the fluid amplifier. If desired, operation of the limiter walls may be aided by provision for aspirating passage or vents 35–36. Once through the "control region" and into the "jet region" any excess fluid in the deflected power stream is vented at 37–38 to ambient in the normal manner, as shown in the drawing.

As shown in FIG. 5, the limited and decoupled signal is in the form of a square wave having the same frequency as the sinusoidal input signal. This signal, directed to receive port or channel 31 in the fluid operated device 20, is then fed to an input chamber 41 in the "derivative" circuit or stage 40. Chamber 41 is connected through orifices 42 and 43 to a pair of input channels 44 and 45. Leg or channel 44 will be seen to be of substantially the same size as the leg or channel 24 in the "decoupler-limiter" stage 20. The other channel 45, while larger, is not as large as the capacitive channel 25 of the decoupler-limiter. The "derivative" stage or circuit 40 comprises a fluid amplifier device having a main power fluid source port 46, supplied by a pressurized source (not shown), the port leading to a main power jet or nozzle 47. As the square wave signal passes through orifice 42 and enters the smaller, or resistive leg 44 of the derivative stage, pressure variations in the signal are immediately effective on the main power fluid through control port 48. Assuming a rise in pressure, i.e., a positive going portion of the square wave, the output pressure in receiver channel 51 will also rise essentially at the same rate due to deflection of the main power stream. At the same time, due to the capacitive action of input channel or leg 45 there is no corresponding instantaneous pressure level rise at control port 49. Since the device is "tuned" to provide the proper rate function, when the signal at port 48 is at its maximum or slightly thereafter, the signal at port 49 begins to be effective to deflect the main power jet back to its normal or "null" position. The effect at the receiver port 50 in an increasing pressure, i.e., a return to the constant steady state or "null" value. The result is a push-pull output from receivers 50 and 51 of the "derivative" stage 40 in the form of a differentiated square wave, i.e., the pulsed wave form shown in the FIG. 5 schematic. The fluid amplifier device 40 also includes vent ports 52 and 53, which, in this case, are of the open variety.

It will be understood, therefore, that the "time constant" of stage 40 is established so that pulses of uniform width having a pre-determined time constant are produced. In other words, as described above, provision is made for accomplishing essentially full decay for each variation of the square wave input signal to the "derivative" circuit 40 in order to assure the "null" point being reached in each case before the input signal polarity reverses direction. This, again, enables the "rectified" signal to linearly follow the frequency changes in the output of the signal generator 10 up to a time period equal to or less than one-half of the frequency of the input signal.

The push-pull output of the "derivative" stage or circuit 40 is next fed to a "full-wave rectifier" 60. As previously pointed out the "rectifier" differs from the devices 20 or 40 in that it has but a single receiver channel or leg 62 located on the centerline of the fluid amplifier main jet, as seen in FIGS. 4 and 5. Thus, a pressure differential signal between the control ports or jets 63 and 64 of the "rectifier" causes a decrease in the output pressure at the single receiver. In this manner cyclic variations in the main or power jet issuing from supply port 65 and directed through nozzle 66 will produce a "rectified" output pressure signal. In this instance, the fluid operated device 60 will produce a negative pulse, as shown in the schematic diagram of FIG. 5, for each negative and each positive pulse of the output signal from the "derivative" circuit 40.

The output signal of the "rectifier" 60 is fed to a filter device 70 in order to remove the ripple from the pressure signal. In this instance, filter 70 is in the form of a fluid capacitance or volume connected intermediate the receiver output channel 62 and one input channel 71 of the final push-pull analog amplifier, indicated generally at 80. While a capacitance filter is indicated, it will be understood that combined resistance-inductance-capacitance fluid filter could be used if desired. The smoothed signal at input port 71 of device 80 is opposed by a fixed characteristic or "D-C" speed reference signal connected to input channel 72 and thence to control port 73. As before, these pressure levels pass through control jets 71 and 73 and are perpendicularly opposed across the main power stream of the fluid amplifier issuing from nozzle 75, supplied by pressure source port 76. The result is a differential pressure output signal $\Delta P_{1-2}$ at the receiver channels 77 and 78, which is proportional to the error or pressure difference. When the desired speed is reached the outputs of the receiver ports ae equal and the pressure in lines $P_1$ and $P_2$ are equal, i.e., there is no differential pressure. However, if the speed is high the output at receiver 77 will be less than that at receiver 78 (controlled by the reference signal). This results in pressure $P_1-P_2$ going positive. If the shaft speed is low, on the other hand, $P_1-P_2$ will be going negative.

Thus, in the above described embodiment of a pneumatic derivative speed governor circuit, starting at the lower frequencies the spikes or pulses of the output signal from the "derivative" circuit 40 are more widely spaced and occupy a smaller percentage of the cycle time. As a result, the "D-C" component or pressure level output of the FIG. 5 circuit is greater. However, as the frequency increases, the derivative pulses occupy an increasingly greater percentage of the cycle time, which results in a reduction of the "D-C" component of the rectifier output and a corresponding reduction of signal strength or pressure at control port 74. With a "D-C" speed reference signal set at a pressure calling for the equivalent of 39 c.p.s., in one instance the circuit of the invention as described was found to have the wide range capability indicated by the graph of FIG. 6.

While particular embodiments of the means and method of the present invention have been disclosed, it will be obvious to those skilled in the art that various changes and modifications may be made in the embodiments thereof without departing from the spirit or scope of the invention, and it is therefore intended in the appended claims to cover all such equivalent variations and modifications.

What we claim and desire to secure by Letters Patent is:

1. A fluid-operated circuit for equipment regulation comprising:
   means generating a fluid pressure input signal fluctuating at a rate dependent upon a monitored operating condition of said equipment;
   means converting said fluctuating fluid pressure input signal to a substantially steady state fluid pressure output signal having a magnitude proportional to the frequency of fluctuation of the input signal, said signal converting means including,
      (a) first fluid-operated means generating a fluid pressure signal of limited amplitude fluctuating at the same rate as the input signal,
      (b) second fluid-operated means in flow communication with said first means and receiving said fluctuating fluid pressure signal of fixed amplitude therefrom and generating in response thereto a series of pulses having a uniform energy value representing a pressure-time constant for each fluctuating of said signal of limited amplitude, and
      (c) third fluid-operated means responsive to said pulses for averaging same over a finite period time to produce said steady state signal; and
   means applying said stead state output signal to said equipment for enabling return thereof to a normal operating condition whenever said monitored operating condition becomes abnormal.

2. The signal converting means according to claim 1 wherein said first and second fluid-operated means comprise a digital amplifier device and a rectifier device, respectively, and further, wherein there is at least one fluid capacitance in the connection between said first and second devices, the value of said capacitance and the output and input impedances of said first and second devices, respectively, being selected to cause a finite time period of exponential fluid pressure rise and decay for each fluctuation of said input signal to provide a uniform time constant for each of said control pulses.

3. A fluid-operated circuit for generating a substantially steady state output signal in response to a fluctuating fluid pressure input signal, said circuit comprising:
   (a) means deriving a series of control pulses from said input signal, said control pulses having a uniform energy value representing a pressure-time constant for each fluctuation of said input signal, and
   (b) means responsive to said control pulses for averaging of said pulses over a finite period of time to produce said steady state signal output;

whereby the magnitude of said steady state signal is proportional to the frequency of said input signal.

4. A fluid-operated circuit comprising:
means generating a fluctuating fluid pressure input signal representing a monitored equipment operating condition;
means generating a reference steady state fluid pressure signal;
means for converting said fluctuating fluid pressure input signal to a substantially steady state fluid pressure output signal including
   (a) means deriving a series of control pulses from said input signal, said control pulses having a uniform energy value representing a pressure-time constant for each fluctuation of said input signal, and
   (b) means responsive to said control pulses for averaging same over a finite period of time to produce said steady state output signal,
whereby the magnitude of said steady state output signal is proportional to the frequency of said input signal; and
means receiving said reference signal and said proportional steady state fluid pressure output signal simultaneously for comparison thereof and generation of an error signal as a result of any difference in the magnitude of the fluid pressure levels therebetween.

5. A fluid-operated frequency sensing converter circuit comprising:
transducer means generating a sinusoidal fluid pressure signal representing a monitored value of a selected equipment operating condition;
reference means generating a reference fluid pressure signal or fixed characteristic representing a desired value of the selected equipment operating condition;
means receiving the sinusoidal fluid pressure signal from said transducer for converting same to a substantially steady state fluid pressure output signal including,
   (a) a first fluid-operated device in communication with said transducer means and receiving the sinusoidal fluid pressure signal therefrom for generating in response thereto a fluid pressure output signal of limited amplitude varying at the same frequency as the sinusoidal input signal,
   (b) a second fluid-operated device in communication with said first device and receiving said fluid pressure signal of limited amplitude therefrom for generating in response thereto a series of positive and negative pressure pulses for each cycle of said limited amplitude input signal to said second device, said pulses having a uniform energy value representing a pressure-time constant for each fluctuation of said input signal,
   (c) a third fluid-operated device in communication with said second device and responsive to said pulses therefrom for averaging same over a finite period of time to produce said substantially steady state fluid pressure signal, said signal pressure level being a function of the frequency of said sinusoidal input signal from said transducer means; and
means receiving said reference fluid pressure signal and said steady state fluid pressure signal from said reference means and said converter means, respectively, simultaneously for comparison thereof and generation of an error signal in response to any difference in the magnitude of the pressure level therebetween.

6. A fluid-operated frequency sensing converter circuit comprising:
transducer means for generating a sinusoidal fluid pressure output signal representing a monitored value of a selected equipment operating condition;
first fluid-operated means in communication with said transducer means and receiving the output signal thereof for generating in response thereto a fluid pressure output signal of limited amplitude varying at the same frequency as the sinusoidal signal from said transducer means;
second fluid-operated means in communication with said first means and receiving the output signal therefrom for generating in response thereto a series of fluid output pulses comprising a control signal having the same frequency as the output signal of said second fluid-operated means, said pulses having a uniform energy value representing a pressure-time constant for each fluctuation of said input signal;
third fluid-operated means in communication with said second means and responsive to said output pulses thereof for averaging same over a finite period of time to produce a substantially steady state signal having a "D-C" pressure level which is a function of the frequency of said sinusoidal transducer signal; and
fourth fluid-operated means in communication with said third fluid-operated means and responsive to the steady state fluid pressure signal therefrom and to a "D-C" reference fluid pressure signal representing a desired value of the selected equipment operating condition, said fourth means generating an error signal representing the differential pressure between said "D-C" reference fluid pressure signal and said steady state fluid pressure signal.

7. In an engine control system a fluid-operated frequency sensing converted circuit comprising:
transducer means generating a sinusoidal fluid pressure output signal representing a monitored value of a selected engine operating condition;
first fluid amplifier control means in communication with said transducer means and receiving the output signal thereof generating in response thereto a fluid pressure output signal of limited amplitude varying at the same frequency as the sinusoidal signal from said transducer means;
second fluid amplifier control means in communication with said first means and receiving the output signal therefrom for generating in response thereto a control signal having the same frequency as the output signal of said second fluid-operated means, said control signal comprising a series of fluid pressure pulses each having a pressure-time constant of uniform value for each fluctuation of said input signal;
third fluid amplifier control means in communication with said second means and responsive to the output pulses thereof for averaging of said pulses over a finite period of time to produce a substantially steady state signal having a "D-C" fluid pressure level which is a function of the frequency of said sinusoidal transducer signal; and
fourth fluid amplifier control means in communication with said third means and responsive to said steady state fluid pressure signal therefrom and to a "D-C" reference fluid pressure signal representing a desired value of the selected engine operating condition, said fourth control means generating an error signal representing the differential pressure between said reference fluid pressure signal and said steady state fluid pressure signal, said error signal being operative to effect a return of said engine to said desired value of said selected operating condition.

References Cited

UNITED STATES PATENTS 3,248,043   4/1966   Taplin _____ 60—39.28
3,292,648   12/1966   Colston _____ 137—36

CLARENCE R. GORDON, *Primary Examiner.*